J. Reese,
Cotton Bale Tie.
No. 61,868. Patented Feb. 5, 1867.
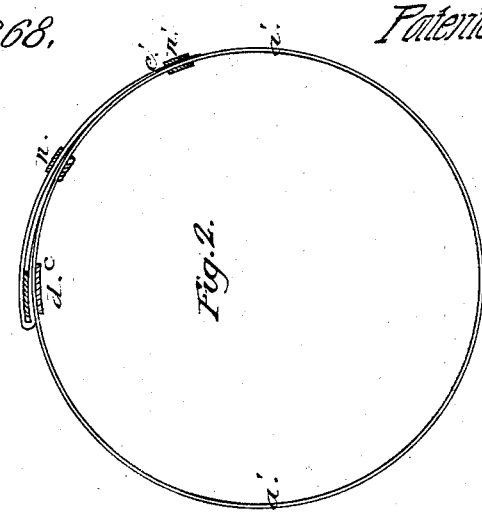
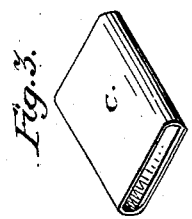
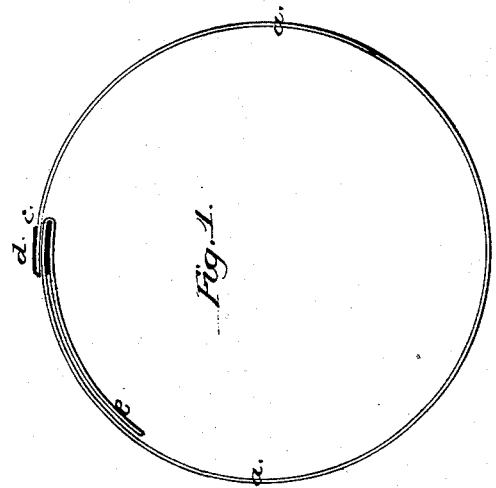
Witnesses:
A. H. Hurd
W. F. Graham
Inventor:
Jacob Reese
by Bakewell & Christy
his Attorneys.

United States Patent Office.

JACOB REESE, OF PITTSBURG, PENNSYLVANIA.

Letters Patent No. 61,868, dated February 5, 1867.

---

IMPROVEMENT IN FASTENING FOR BALE HOOPS.

---

The Schedule referred to in these Letters Patent and making part of the same.

---

TO ALL WHOM IT MAY CONCERN:

Be it known that I, JACOB REESE, of Pittsburg, in the county of Allegheny, and State of Pennsylvania, have invented a new and useful Improvement in Fastening for Bale Hoops; and I do hereby declare the following to be a full, clear, and exact description thereof, reference being had to the accompanying drawings, making a part of this specification, in which—

Figure 1 is a section passing through the entire length of the hoop and showing one form of my improved fastening.

Figure 2 is a similar sectional view, showing another form of my improved fastening; and Figure 3 is a perspective view of the loop employed, as hereinafter to be described.

Like letters of reference indicate like parts.

When cotton, hay, hemp, flax, or other light articles of a similar character, are to be packed in bales, it is desirable to enclose them in hoops, which may be readily placed around them when they are sufficiently compressed, and which can then be easily and securely fastened. If, in addition thereto, the hoop can be easily removed when the bale is to be opened, and still be in a fit condition, to be used again in rebaling the cotton or other articles, its value will thereby be materially enhanced.

The nature of my invention consists in constructing a hoop adapted to such purposes.

To enable others skilled in the art to make and use my invention, I will proceed to describe its construction and operation.

From hoop iron, or other material adapted to such purposes, and rolled out to the proper width and thickness, I cut the metallic bands or hoops $a$ and $a'$, of a length somewhat in excess of the circumference o h bale to be secured. From the same material I construct the loops $c\ c$, as shown in fig. 3, by folding the two ends together and securing them by rivets, $d\ d$, and make them of sufficient size to encompass somewhat loosely two thicknesses of the loop $a$ or $a'$. By the rivet $d$ that secures the loop $c$, I attach such loop to one end of the hoop $a$, with the open side of the loop $c$ on either the inside or outside of the hoop $a$. Fig. 1 shows it on the inside. In such case I put the hoop around the bale after it has been sufficiently compressed, slip the end $e$, opposite the loop end, through the loop $c$, and after drawing it tight, fold the end $e$ back and under, making an acute angle or short curve at the point of bending, and slip it in between the main part of the hoop $a$ and the bale. The outward pressure of the bale then keeps it in position. The folding of the hoop end $e$ back so as to secure an acute angle, or a short curve at the point of bending, is a valuable feature of my invention. That part of the hoop embraced within the loop $c$ is held firmly down by the loop itself, while the corresponding part under the loop $c$ is pressed out against the loop by the bale, consequently the hoop is thus folded and held at the point of folding, with a degree of compression from both sides, such that, with the sharp angle or short curve which it necessarily makes, the possibility of its slipping is wholly obviated. The hoop is removed, when the bale is to be opened, by simply reversing the operation. The hoop can be again used; and as bales are seldom of exactly of the same size, the hoop will seldom be bent twice at the same point when the end $e$ is being folded back and under, so that it will be in little or no danger of being broken by being repeatedly bent. More commonly, however, I adopt the construction shown in fig. 2. The loop $c$ is then riveted by a rivet, $d$, to the end of the hoop $a'$, with its open part projecting on the outer side of the hoop. Before putting it on the bale, I slip usually two sleeves, $n\ n'$, which are similar in construction to the loop $c$, fig. 3, loosely on to the hoop $a'$. I then place the hoop around the bale, as above described, slip the end $e'$ through the loop $c$, draw it tight and fold the end $e'$, making an acute angle or short curve at the point of bending backward, till it has the position shown in fig. 2. The sleeves $n\ n'$ are then slipped on to it, one, $n$, sufficiently close to the loop $c$, to hold the folded end $e'$, near the point of bending, closely down and prevent its slipping around the opposite edge of and through the loop $c$, and the other, $n'$, to keep the extreme end $e'$ in its place. The compression thus produced on the hoop, at or near the point of curvature, by the joint action of the loop $c$, and the sleeve $n$, secures an acute angle or short curve at the point of folding, which, as hereinbefore described, effectually precludes the possibility of the fastening becoming loosened. If the folded end $e'$ of the hoop $a'$ is not long, one sleeve, $n$ or $n'$, may be sufficient. When the bale is to be opened, the hoop $a'$ may be removed by reversing the operation, and the hoop again used for the same or similar purposes, substantially as hereinbefore set forth.

The advantages of this bale tie over other ties which require the hoop to be punched, consist, among other things, in the fact that it is punched for but one rivet, $d$, and there the part purchased is supported and strengthened by the loop $c$; so that three-quarter inch hoop iron by this plan is as strong as one-inch hoop iron punched and fastened in the usual way, since such punching weakens the iron to a breadth considerably in excess of the diameter of the rivet hole, by destroying or lessening the tenacity of the metal immediately surrounding; and if the hoop at that point be unsupported, it is weakened correspondingly. The making of the loops $c$, and the sleeves $n\ n'$, involves no increase of expense, since they are the simplest form of loop or sleeve made for such uses, and can be made from short pieces and scrap ends, which would otherwise go to waste.

What I claim as my invention, and desire to secure by Letters Patent, is—

1. The loop $c$, constructed and attached, substantially as described, to one end of a metallic hoop, and of sufficient size to admit the opposite end of such hoop, so that when such opposite end is passed through and folded back in either of the forms described, it will be held in place either by the outward pressure of the bale, or by sleeves $n\ n'$, one or more.

2. Compressing the folded end of a hoop, at or near the point of folding, by the joint action of the loop $c$ and bale, or of the loop $c$ and sleeve $n$, for the purpose of preventing the slipping of the hoop at the point of fastening, substantially as described.

3. The sleeves $n\ n'$ of a metallic hoop, in combination with the loop $c$, for the purpose of fastening bale hoops, substantially in the manner described.

In testimony whereof I, the said JACOB REESE, have hereunto set my hand in presence of—

JACOB REESE.

Witnesses:
   A. S. NICHOLSON,
   GEO. H. CHRISTY.